United States Patent [19]
Fritsche

[11] Patent Number: 6,141,407
[45] Date of Patent: *Oct. 31, 2000

[54] METHOD AND ARRANGEMENT FOR RESOLVING PERFORMANCE FEATURE INTERACTIONS IN A COMMUNICATION SYSTEM

[75] Inventor: Norbert Fritsche, München, Germany

[73] Assignee: Siemens Aktiengesellschaft, Munich, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/817,034

[22] PCT Filed: Sep. 22, 1995

[86] PCT No.: PCT/DE95/01318

§ 371 Date: Mar. 24, 1997

§ 102(e) Date: Mar. 24, 1997

[87] PCT Pub. No.: WO96/09728

PCT Pub. Date: Mar. 28, 1996

[30] Foreign Application Priority Data

Sep. 22, 1994 [DE] Germany .............................. 44 33 878

[51] Int. Cl.$^7$ ................................................. H04M 3/42
[52] U.S. Cl. .......................................... 379/201; 379/207
[58] Field of Search .................................. 379/201, 229, 379/230, 207

[56] References Cited

U.S. PATENT DOCUMENTS

| | | | |
|---|---|---|---|
| 5,337,351 | 8/1994 | Manabe | 379/201 |
| 5,404,396 | 4/1995 | Brennan | 379/201 |
| 5,448,631 | 9/1995 | Cain | 399/204 |
| 5,737,403 | 4/1998 | Zave | 379/201 X |
| 5,793,860 | 8/1998 | Brieskorn | 379/201 X |

FOREIGN PATENT DOCUMENTS 0 590 334 A1   4/1994   European Pat. Off. .

WO 95/22222   8/1995   WIPO .

OTHER PUBLICATIONS

Sato et al. "Hierarchical Network Data Management Architecture Applied to the Public Telephone Network," ATT Electrical Communications Laboratories, Tokyo, Japan, pp. 0964–0968.

Sato et al. Functional Elements for Switching Software Based on Object–Oriented Paradigm with UPT as an Example, *IEICE Trans. Commun.*, vol. E75–B, No. 10, Oct., 1992, pp. 1052–1060.

(List continued on next page.)

*Primary Examiner*—Creighton Smith
*Attorney, Agent, or Firm*—Hill & Simpson

[57] ABSTRACT

A method is indicated for resolving performance feature interactions (FI) in a communication system with mutually decoupled switching control (BSN) and performance feature control (FN), having a plurality of performance features ($LM_i$, $LM_j$). The performance features ($LM_i$, $LM_j$), which respectively act differently on different subscriber terminal units (A, B, C, D; Device$_A$, Device$_B$, Device$_C$) are correspondingly divided into several roles (Rolle$_{i1}$, Rolle$_{i2}$, Rolle$_{i3}$, Rolle$_{j1}$, Rolle$_{j2}$) that are taken on by individual subscriber terminal units (A, B, C, D; Device$_A$, Device$_B$ and Device$_C$.) in the course of the respective performance feature sequences. Before the taking on of a new role (Rolle$_{i1}$, Rolle$_{i2}$, Rolle$_{i3}$, Rolle$_{j1}$, Rolle$_{j2}$), its compatibility with roles already taken on is hereby respectively tested. If warranted, specific actions are additionally carried out in order to ensure the specified interaction of the desired performance features ($LM_i$, $LM_j$), the coexistence of all roles taken on and the avoidance of deadlocks of the functional sequence. A communication system suited for carrying out such a method, having mutually decoupled performance feature control (FN) and switching control (BSN) that communicate with one another via an interface, contains a performance feature interaction manager (FIM) for the resolution of the performance feature interactions (FI), which manager is allocated to the performance feature control (FN) and is arranged in the region of the interface.

5 Claims, 3 Drawing Sheets

OTHER PUBLICATIONS

Chipalkatti et al. "A Prototype of a Service Management System for the Intelligent Network," GTE Laboratories, Inc., Waltham, MA, 1993, pp. 1931–1937.

Elixman, M. et al. "Service Creation Environment—A Development Environment for Services in the Intelligent Network," *PTR Philips Telecommunication Review*, vol. 50, No. 1, Mar., 1992, pp. 34–38.

"Distributed Functional Plane for Intelligent Network CS–1", pp. 7–69, & 7–9.

After activation has ensued

Dynamic calling of the forwarding calls of the CFU source

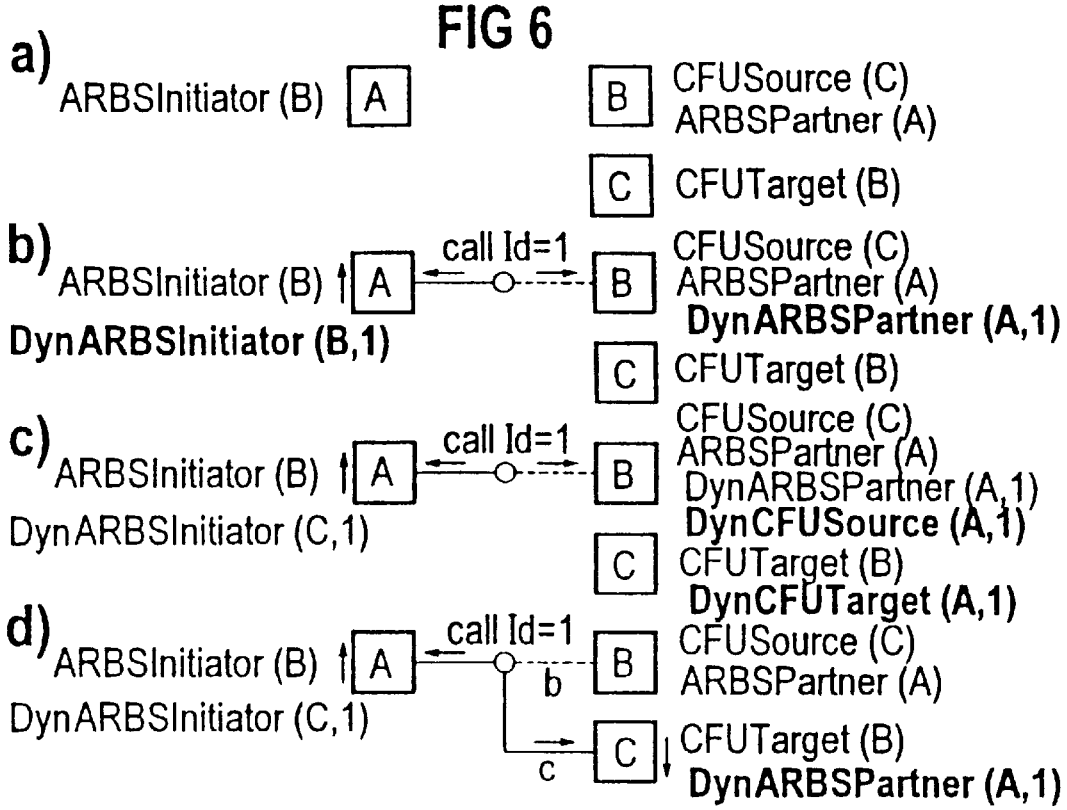
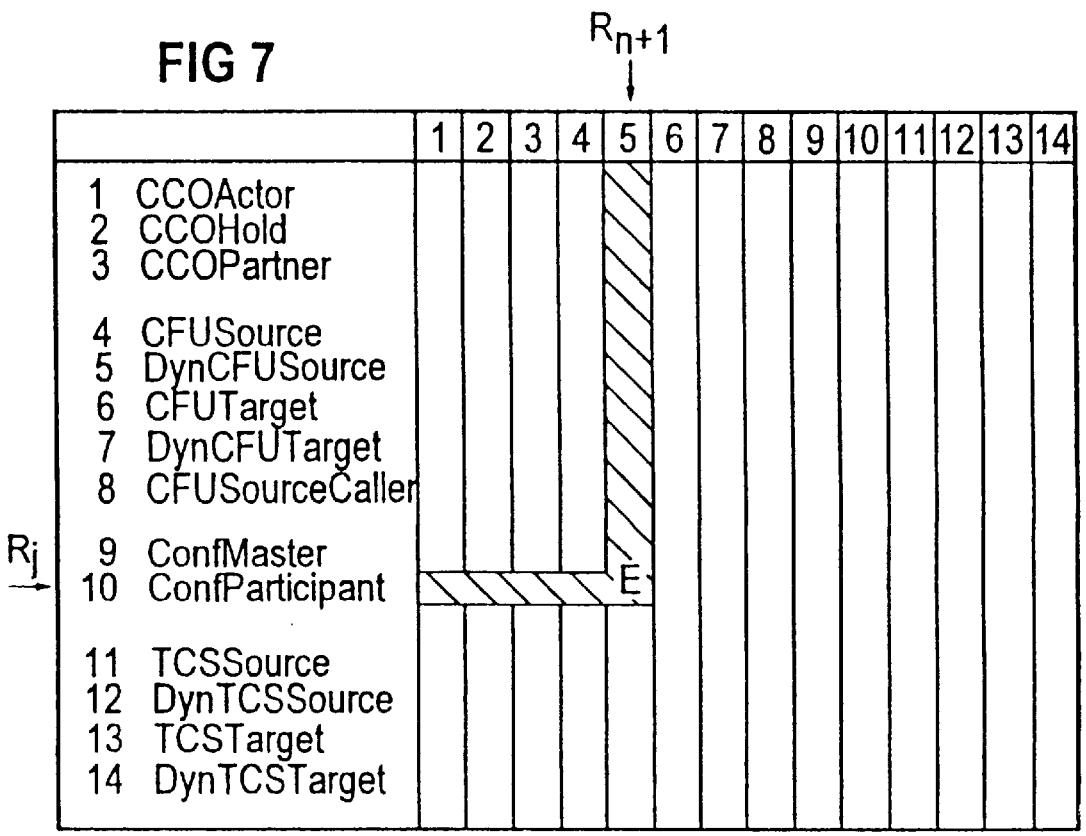

METHOD AND ARRANGEMENT FOR RESOLVING PERFORMANCE FEATURE INTERACTIONS IN A COMMUNICATION SYSTEM

BACKGROUND OF THE INVENTION

The present invention relates to a method and arrangement for resolving performance feature interactions in a communication system with switching control and performance feature control decoupled from one another, in what are called IN-type architectures (in this context, IN means Intelligent Networks).

Prior art switching systems support a plurality of performance features. These features include auxiliary telecommunication services, such as for example:

Call forwarding CFU;
Call forwarding when busy CFBS;
Call forwarding when idle CFNR;
Speed dialing SD;
Selective station guarding TCS;
Callback CC, alternation CA, transfer CT;
Call waiting CO, accept waiting call TCO;
Conference CONF; and
Automatic callback when busy ARBS.

Two types of performance features are to be distinguished. On the one hand there are performance features that are explicitly activated (FReq) and are called in response to reception of an initiating event. The feature CFU is an example of this type. On the other hand, there are performance features that are called directly (via FReq) without having been activated previously, such as when activation and calling coincide. The features CONF or CC are examples of this. All performance features can be requested using an "activation" message FReq.

In processor-controlled switching installations, performance features are realized within the switching control sequences. These switching control sequences, also called switching software, contain the call controlling as well as the performance features. The performance features are combined with the call controlling, as well as with one another. This leads to a high degree of software complexity, whereby the software structure becomes inflexible with respect to the introduction of newer performance features. In order to shorten the long introduction times for new performance features, consideration has been given to the possibility of realizing the parts of the control sequences, that were previously dependent on one another, as separated from one another in independent modules that respectively have a fixed external interface. Approaches to the separation of the performance feature control from the switching control are pursued in the context of the standardization processes relating to intelligent networks "Intelligent Network" in ITU-T SG 11. On this subject, see the CCITT guidelines "New Recommendation Q.1214, Distributed Functional Plane for Intelligent Network CS-1, COM XI-R212-E", pages 7 to 69, as well as appendix pages 7 to 9.

A cleanly structured switching architecture results from the decoupling of the performance feature control from the switching control, which is reduced to its basic functionality. This switching architecture is constructed in a very modular fashion, and allows the rapid introduction of new performance features. Moreover, a development independent of the performance features and the call control is enabled by the separation of the performance features.

A structure of this sort divides a switching system or, respectively, the switching software into a basic switching system and a performance feature system, i.e., the switching control and the performance feature control are decoupled from one another. The main components of a basic switching system are a call control, a database and a plurality of performance feature control components. The call control is reduced to its fundamental tasks, the setting up and clearing down of connections or, respectively, calls, and is thus designated the basic call control. The performance feature control components form a set of functions, via which access can take place to the call objects and via which calls can thus be manipulated.

The performance features themselves are contained in the performance feature system, which communicates with the basic switching system via a protocol. The basic call control of the basic switching system has the job of carrying out the setting up and clearing down of calls or, respectively, of the associated connections according to subscriber requests. In the context of its normal operating sequence, it thus handles a two-subscriber call. In addition, mechanisms are provided for the reporting of determined events to the performance feature control. The basic switching system can control a call between two subscribers without influence of the performance feature system; i.e., it is independent of the setting up and clearing down of two-subscriber calls. A two-subscriber call exists between two communication terminal apparatus respectively allocated to subscriber terminal units. Each of the terminal apparatus respectively has a connection that creates the relation between a communication terminal apparatus and the call. A state automaton is respectively allocated to each connection. The connections are linked with one another via the call.

Determined processes, triggered by external events, take place between the states of the state automata. Such events are subscriber/network messages or internal messages, namely messages between the two connections of a call. "Performance feature interactions" take place between individual performance features that are simultaneously activated and have been called or are to be called. The term "performance feature interactions" hereby comprises all interactions connected with the desired operation of a performance feature LM. These are interactions of the performance feature with its environment, i.e. other performance features, but also other calls (activations) of the same performance feature.

Impermissible performance feature interactions can lead to disturbances in the switching sequence. It is thus recommended that the performance feature interactions be resolved in order to avoid such disturbances.

SUMMARY OF THE INVENTION

It is an object of the present invention to provide a method for resolving performance feature interactions in a communication system.

In general terms the present invention is a method for resolving performance feature interactions. The method comprises the steps of: dividing performance features which act differently on different subscriber terminal units into several roles that are taken on by individual subscriber terminal units during respective performance feature sequences; and testing the compatibility of the new roles with roles already taken on before the taking on of a new role.

A further object of the present invention is to provide an arrangement for carrying out a method for resolving performance feature interactions in a communication system.

In an embodiment, specific actions are executed by a subscriber terminal unit upon the additional taking on of a role to achieve the specified interaction of the desired performance features, the coexistence of all roles taken on and the avoidance of failure of the functional sequence.

In an embodiment, the role parameters are tested during testing of the compatibility of the roles.

In an embodiment, performance features are divided into static roles to be taken on during its activation before its calling, and dynamic roles to be taken on during its calling.

In another embodiment of the present invention, a communication system is provided. The system has a performance feature control and a switching control that is decoupled from the performance control and communicates with one another via an interface. A performance feature interaction manager is allocated to the performance feature control and is arranged in a region of the interface for distribution of events communicated by the switching control to performance features and for testing the compatibility of the coexistence of performance features that are simultaneously in effect for the same subscriber terminal unit.

This aim is solved in a communication system, which has a basic switching system and a performance feature system decoupled from one another, by means of a performance feature interaction manager at an event interface between the basic switching system (basic switching node) BSN and the performance feature system FN (feature node). The manager controls the resolution of the performance feature interactions.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

FIG. 6 shows an example of performance feature interactions for the subscriber terminal units and of the allocated roles; and FIG. 7 shows a portion of a role compatibility matrix.

DESCRIPTION OF THE PREFERRED EMBODIMENTS

Figure 2:
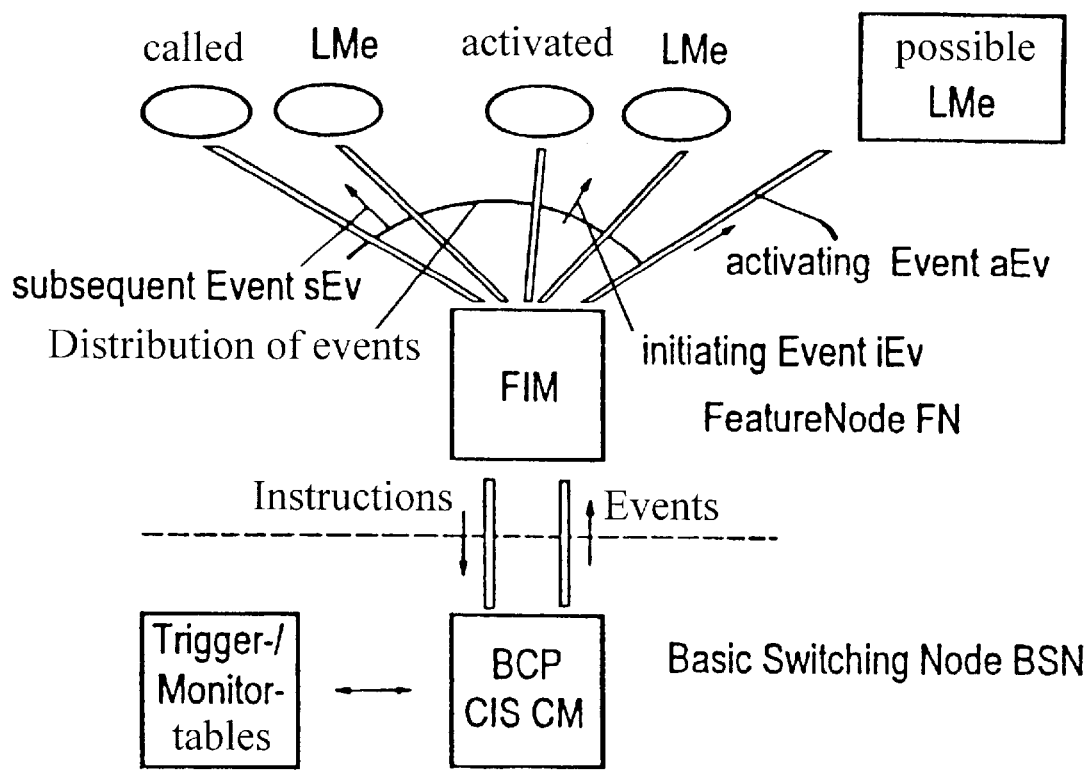
FIG. 2 shows the arrangement of a performance feature interaction manager within a communication system, with performance feature control and switching control decoupled from one another, as well as the type of distribution of events transmitted by the switching control via an interface of the performance feature control to performance features that are of a different kind and are in a different state.

In an embodiment of the invention, the performance feature interaction manager has the task of the correct distribution of the events generated by the basic switching system BSN to the performance features that are active and activated or, respectively, are to be activated (see FIG. 2).

If determined performance features are already activated or called, the essential inventive task of the performance feature interaction manager FIM is the testing of compatibility upon the reception of a further performance feature request (activation) (FReq) or of a calling event.

This means the testing of the compatibility of the requested performance feature with already-activated or, respectively, active (called) performance features.

A further aim of the performance feature interaction manager is to ensure the user requests for the performance feature interaction, and thus the monitoring of the maintaining of the performance feature specification.

In addition, the performance feature interaction manager ensures the interaction of coexisting performance features, thus avoiding inconsistencies in the interaction.

If certain performance features for a particular event have already been called (namely, performance features to be activated (activating event), performance features to be called, i.e. to be started (initiating event), or performance features awaiting successor events (subsequent events)), then a further task of the performance feature interaction manager can be the distribution of the corresponding event. The reception of a message from the basic call control or from a subscriber terminal unit (TAE=device) is what is meant by an event in this sense. When several parties are present, the performance feature interaction manager thus decides which called performance features, activated performance features and/or performance features to be activated, are assigned to the event.

In principle, two types of performance feature interactions can be distinguished. There are functional interactions, also called semantic interactions, which are functional interactions of performance features in the sense of the functional performance feature control sequence. These have visible effect for the user. They are user-related, influence the functional, specified performance feature sequence, and occur upon activation or, respectively, upon calling. They concern the compatibility between performance features. User requests, determined for example by specification, make decisions concerning the manner in which they are handled. If for example the initiator of the performance feature "automatic callback when busy" (ARBS) has activated "call forwarding" (CFU), it is determined by means of the specification whether a callback should be rerouted.

The specific requirements of the inventive method are different for performance features to be activated than for performance features to be called:

During the activation of the performance feature $LM_i$ (FReq(T–$M_i$)), its compatibility with already-activated performance features (e.g. call forwarding CFU, automatic callback when busy ARBS) or, respectively, called performance features (e.g.: callback CC, conference CONF) is tested. Conflicts with respect to the allocation of the activation message cannot arise, because the performance feature designation is unambiguous. However, the introduction of measures necessary for the coexistence of both performance features can be required.

During the calling of the performance feature $LM_i$ (FReq ($LM_i$), or during the occurrence of the calling event (iEv$_{LMi}$), the compatibility of the performance feature $LM_i$ with already-activated or, respectively, called performance features is tested. Conflicts with respect to the allocation of the call message can arise only during the calling of a performance feature by an event after previous activation. However, the introduction of measures necessary for the coexistence of both performance features can be required.

Figure 3:
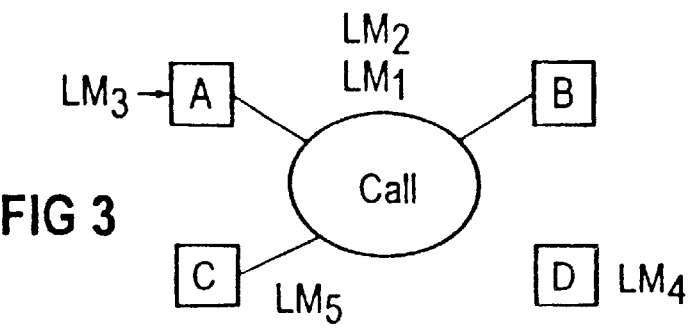
FIG. 3 shows the complexity of the performance feature interactions and the possibly interacting performance features for an exemplary call structure and performance feature distribution.

In order to test compatibilities between arbitrary kinds of performance features, the quantity of performance features to be considered and their locality is to be determined, i.e. it must be determined which activations of which subscriber terminal units and which call-related performance features are to be taken into consideration, and how. This is very costly. In the example shown in FIG. 3, the performance feature $LM_3$ is to be activated for the subscriber terminal unit A, and it is to be determined which other performance features are to be taken into account for this activation. It is to be taken into account that the subscriber terminal unit A is a partner of the call Call, in which the partners B and C both still take part, that the performance features $LM_1$, and $LM_2$ are called for the call Call, and that the performance feature $LM_5$ is activated for the subscriber terminal unit C. The performance feature $LM_4$ activated for the subscriber unit D must if necessary also be taken into account if the subscriber terminal unit D is to be included in the control sequence of the performance feature $LM_3$.

It turns out to be useful to introduce the subscriber terminal unit (TAE) as a reference point in order to be able to handle compatibilities locally through testing of all subscriber terminal unit characteristics connected with performance features. Performance features are here divided into roles that are taken on by subscriber terminal units included in the performance feature control sequence.

Figure 4:
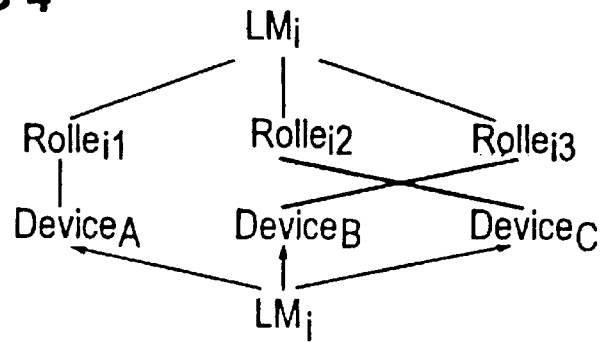
FIG. 4 shows the connection of performance features, roles and subscriber terminal units.

FIG. 4 shows the relationship between performance features $LM_i$, roles $Rolle_{i1}$, $Rolle_{i2}$, and $Rolle_{i3}$, as well as subscriber terminal units $Device_A$, $Device_B$ and $Device_C$. The performance feature $LM_i$ acts on the subscriber terminal units $Device_A$, $Device_B$ and $Device_C$, and is divided into roles $Rolle_{i1}$, $Rolle_{i2}$ and $Rolle_{i3}$. The role $Rolle_{i1}$, taken on by the subscriber terminal unit $Device_A$, differs from the roles $Rolle_{i2}$ and $Rolle_{i3}$ which can be exchanged with one another in terms of their function, and which are taken on by the subscriber terminal units $Device_B$ and $Device_C$.

Subscriber terminal units take on determined "roles" in the performance feature life cycle, i.e. during the processing of the performance feature state automata, and are thus included in the performance feature control sequence in a determined manner. This role assumption is coupled to determined events that are important for the performance feature control sequence. These events make decisions concerning the "life span" of the various roles for a subscriber terminal unit that is taking part in a performance feature.

Figure 5:
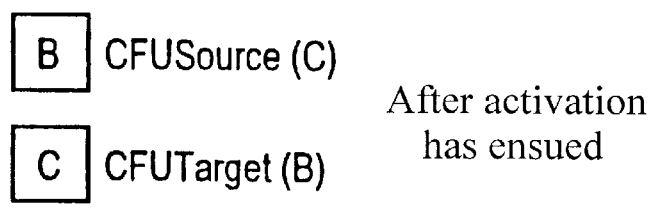
FIG. 5 shows the role of the call forwarding performance feature, according to activation and calling of the performance feature.
Figure 5:
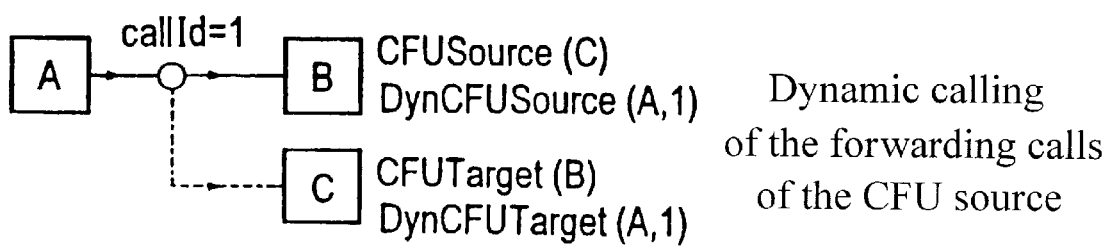

The performance feature call forwarding CFU (Call Forwarding Unconditional), shown in FIG. 5 with its roles, for example both static roles, which are taken on by the subscriber terminal units during activation, and also dynamic roles, which are taken on during the calling of the forwarding, thus upon an incoming call to the forwarding source. During the calling, these dynamic roles are requested in addition to the static roles. FIG. 5 shows the roles with respectively valid role parameters, whereby, in addition to the subscriber terminal unit parameter A, the dynamic roles also contain the call parameter callID 1.

The connection between the performance feature interactions and the taking on of roles is explained in more detail below on the basis of FIG. 1.

In the different states of the performance feature, different roles are assigned to the subscriber terminal units taking part in the performance feature control sequence. These roles must be compatible with performance feature roles already taken on. The performance feature interaction handling for the activation and calling of performance features is thus reproduced in a compatibility test between "roles to be taken on" and already "occupied roles." The interaction between two performance features is thus reproduced in the test of compatibility between two roles when the relevant subscriber terminal unit wishes to take on the role connected with the second performance feature. In addition, a complex compatibility test between performance features is thereby partitioned into several simpler role tests.

If necessary, the roles are parameterized in order to create the relation to partner roles of other participating terminal apparatus, but also to create the relation to the call that is subject to the dynamic performance feature control.

Figure 1:
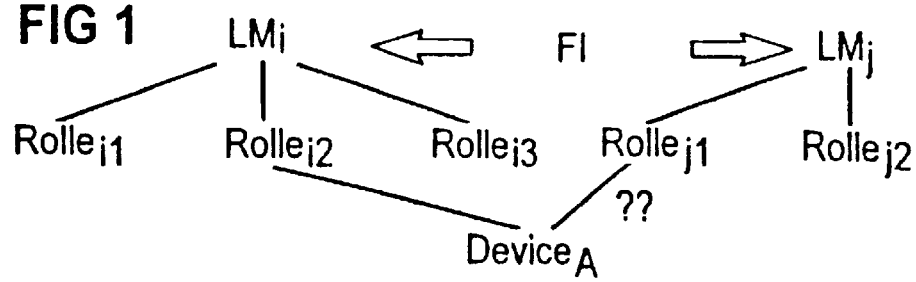
FIG. 1 shows the performance feature interaction between performance features, taking into account their roles and subscriber terminal units.

FIG. 1 illustrates the performance feature interaction FI between the performance features $LM_i$ and $LM_j$. The subscriber terminal unit $Device_A$ is supposed to take on role $Rolle_{j1}$ ($LM_j$), in addition to the existing role $Roll_{i2}$ ($LM_i$). The resolution of the performance feature interaction FI is limited by the compatibility test, related to $Device_A$, of the roles $Rolle_{j1}$ ($LM_j$) and $Rolle_{i2}$ ($LM_i$).

The division of the performance feature interaction method for the case of role assumption upon activation (activation message: FReq ($LM_i$)) and upon calling of a performance feature (FReq ($LM_i$), or $iEv_{LMi}$) proves to be necessary because on the one hand the specification requires a different way of handling the activation in relation to the calling (e.g. max. 3 times forwarding), and in addition the intervention possibilities for the resolution of the interactions for activation and calling are different. A calling can still be blocked after activation. In contrast, after a calling the intervention possibilities for the resolution of the performance feature interaction are slight, and it is difficult to ensure coexistence with other performance features.

The performance feature roles are defined by the performance feature specification, taking into consideration the following aspects:

a role definition is necessary for each performance feature;

the role specifies the effect of the performance feature on the subscriber terminal unit;

the role may be parameterized;

life span:

how long does the subscriber terminal unit contain the role?

does the role change in the performance feature control sequence?

which events are decisive for taking on the role?

which events are responsible for abandoning the role?

role compatibility with existing performance feature roles activation role/calling role static/dynamic roles role priorities The subscriber terminal unit forms the reference point for the taking on of a performance feature role. It can take on a role both explicitly, via a request, or implicitly, via inclusion in a performance feature control sequence that was initiated by another subscriber terminal unit.

Dynamic roles are taken on by subscriber terminal units when a performance feature is called that either has no explicit activation (e.g. callback), i.e. activation and calling coincide, or else an activated performance feature is called by the reception of an event. For dynamic roles, it is important to create the call relation in order to enable the determination, during the role test, whether e.g. an incoming call is subject to a given performance feature (e.g. conference setup), so that this call interacts with the existing roles of the subscriber terminal units differently than a normal incoming two-subscriber call. For this reason, the call ID call-ID is given as a parameter for these roles. In addition, the relaying of dynamic roles is simplified. In call forwarding, e.g. all dynamic roles of the call forwarding source relating to the call to be forwarded are relayed to the call forwarding target. A disadvantage of this call reference is that the call ID has to be known during the request of the dynamic role by the performance feature.

If call references are disregarded, the subscriber terminal unit dependencies of the roles must be greatly expanded, so that a very complex parameter test becomes necessary in order to enable the decision whether a given call is subject to a performance feature.

The principle of the roles taken on by subscriber terminal units in the course of the performance feature control allows pair-by-pair testing for compatibility, whereby a role is to be added to an already existing one. Using suitable tables, an action can be included here that regulates the interaction of two roles or, respectively, of two performance features. A test of this sort is greatly simplified by the use of a role compatibility matrix. FIG. 7 shows an excerpt from such a role compatibility matrix with 14 different roles.

In general, a subscriber unit can take on several roles. However, during the taking on, the pair-by-pair compatibility with already-existing roles is checked. The interaction of n roles is here reproduced in n tests upon the addition of role n+I.

The compatibility query for the role assumption, to be explained in FIG. 7, runs as follows:

May the subscriber terminal unit $TAE_i$ take on the role $R_{n+1}$ if it already contains the role $R_j$? The case is shown of the request of the role DynCFUSource, i.e. calling a call forwarding, under the condition that the subscriber terminal unit is ConfParticipant, i.e. a participant in a conference. The entry E in the matrix specifies the compatibility of the roles, the testing method to be used, and also the actions required when the role is taken on.

The taking on of a role is carried out above all during activation, or, respectively, during the calling of a performance feature or, respectively, of an instance of a performance feature. The following two actions are required during this role request:

testing of the compatibility of the requested roles with existing roles;

if the taking on of the role is possible, actions may have to be carried out that ensure the coexistence of the roles $R_{n+1}$, $R_j$.

The following compatibility tests or, respectively, responses,, and the subsequent actions, are provided upon the request of the role with two role parameters $R_{n+1}(P_1, P_2)$, or with two role parameters $R_j(P_1, P_2)$ for an existing role:

Compatible: yes/no
Type of test:
No interaction
General test:
test for the subscriber terminal unit $TAE_i$
the compatibility of roles $R_{n+1}$ and R
Parameter interaction:
test role parameters of $R_{n+1}$, $R_j$ for required type e.g.:
$P_1(R_{n+1})!=P_1(R_j) \rightarrow$ take on otherwise→reject Performance feature specification prevents interaction e.g.: CFU can be activated only in a quiet state, i.e. a subscriber who has initiated a callback and is thus "off hook" cannot activate CFU.

For the type of test, the following can hereby also be taken into account, if warranted:
Time testing:
time of the taking on of the role $R_j$ is decided
Call-related testing (for dynamic roles only)

$$CallID(R_{n+1}) = CallID(R_j), \text{ then } Reaktion_i$$

$$\text{otherwise } Reaktion_k$$

State-dependent test:

$$Z(LM_{n+1}) = a, \text{ then } Reaktion_i$$

$$\text{otherwise } Reaktion_k$$

In order to ensure the interaction of two performance features that are functionally compatible, in part various operations must be carried out that fulfill the following aims:
consistency of the roles
avoidance of deadlocks
ordered return to the "higher-level" performance feature The processing steps that may be required in role compatibility can be included in the method for the resolution of IM interactions at the point of the taking on of the role, and can be carried out after the role has been taken on.

The actions that can be introduced after the compatibility test has ensued are:
Unlimited acceptance of role $R_{n+1}$
Rejection of $R_{n+1}$
Activation/calling of the performance feature is prevented.
Abandoning of $R_j$, deactivation of $LM_j$
Updating of parameters of $LM_j$
Relaying of roles
Testing whether receivers may take on the role at all; e.g.: $R_j \rightarrow P_1(R_{n+1})$ or: relaying of the dynamic role $R_j$ (A, call$_i$) to the TAE B
Role transformation (from combination of the roles)
Event generation point transformation
Specific $LM_j$ event generation points are transformed from the role possessor $R_j$ to the new role possessor $P_1(R_{n+1})$;
Sending display text to TAE; e.g.: to the role possessor of $R_j$
Special handling for particular performance feature constellation Specific handling routines are provided e.g. max. 3 times forwarding.

A precise description of the compatibility tests (i.e. which parameters of the two roles involved, or, respectively, also the possessors of the roles, are checked for agreement) and a precise description of the actions is required in order to enable these to be generally deposited in a matrix.

Preferably, an interaction is first handled when it arises (thus not looking ahead as far as possible), in order to reduce the testing of partner roles as much as possible, or to avoid them altogether. For the example of call forwarding CFU and selective station guarding TCS, this ensues as follows:

During activation of CFU, testing for a possibly active feature TCS of the call forwarding target does not take place.

This first takes place when the forwarded call is offered to the target, i.e. the calling event for TCS arises. This essentially simplifies the role testing and is a practicable solution in the case of networking.

To ensure the interaction between two compatible performance features, and thereby the associated roles, different actions are necessary that can be initiated by the performance feature interaction manager FIM if a new role is supposed to be taken on by a subscriber terminal unit.

An action of this sort is for example the event generation point transformations, which [. . . ] in the following on the basis of the example, illustrated in FIG. 6, of the interaction between "automatic callback when busy" ARBS and "call forwarding" CFU. Between A of the TAE A and of the TAE B, the "automatic callback when busy" ARBS is activated with A as initiator. For the TAE B, a "call forwarding" CFU to the TAE C is activated. The subscriber terminal units A, B and C have all taken on associated static roles (see a in FIG. 6). If subscriber B reaches the idle state, A takes on the role DynARBSInitiator(B,I). If A accepts the call, the connection to B is added, and the associated dynamic role DynARBSPartner(A,I) is queried (see b in FIG. 6). The event for the calling of CFU occurs with the setup of the connection to B. This leads to the querying of all required dynamic roles, whereby their compatibility with the respectively existing roles for the individual TAE A, B and C is tested (see c in FIG. 6). During the testing of the two roles DynCFUSource and DynARBSPartner for the TAE B, the given specification, which is user-dependent if warranted, is taken into account in order to determine whether the callback should be forwarded or not. If the callback is to be forwarded, the two roles are compatible, but some actions must nonetheless be taken. The dynamic roles of the call forwarding source B, DynARBSPartner, must be taken on by C, so that C becomes the dynamic partner of ARBS. The performance feature ARBS expects the event that the ARBS partner will accept the call and the corresponding event generation point is set for the connection b. However, if the call is forwarded to another target TAE, this event generation point is never reached. Consequently, the event generation point must be transformed into this other target connected with the call (into the connection c), in order to avoid a deadlock in the functional sequence ARBS. In order to ensure the coexistence of the two performance features, these two actions, namely the taking on of the dynamic roles and the transformation of the event generation points, must be carried out. The result is shown in FIG. 6 below.

What is claimed is:

1. A method for resolving performance feature interactions in a communication system with mutually decoupled switching control and performance feature control having a plurality of performance features, the method comprising the steps of:

dividing performance features which act differently on different subscriber terminal units into several roles that are taken on by individual subscriber terminal units in the course of respective performance feature sequences; and testing compatibility of new roles with roles already taken on before taking on of a new role.

2. The method according to claim 1 further comprising the step of:

executing specific actions by a subscriber terminal unit upon additional taking on of a role to achieve a specified interaction of desired performance features, coexistence of all roles taken on and avoidance of deadlocks of a feature sequence.

3. The method according to claim 1 further comprising the step of:

testing of role parameters during testing of the compatibility of the roles.

4. The method according to claim 1 further comprising the step of:

dividing a respective performance feature into static roles to be taken on during the activation of the respective performance feature before calling by the respective performance feature and dynamic roles to be taken on during calling by the respective performance feature.

5. A communication system comprising:

a performance feature control;

a switching control decoupled from the performance feature control and communicating with one another via an interface; and a performance feature interaction manager allocated to the performance feature control and arranged in a region of the interface for distribution of events communicated by the switching control to predetermined performance features and for testing compatibility of coexistence of roles of performance features that are simultaneously in effect for a common subscriber terminal unit.

* * * * *